United States Patent [19]

Nishimura et al.

[11] Patent Number: 4,579,360
[45] Date of Patent: Apr. 1, 1986

[54] FOLDABLE BICYCLE FRAME

[75] Inventors: Ritsuo Nishimura, Urawa; Nobuaki Shimada, Konosu, both of Japan

[73] Assignee: Bridgestone Cycle Co., Ltd., Tokyo, Japan

[21] Appl. No.: 617,391

[22] Filed: Jun. 5, 1984

[30] Foreign Application Priority Data

| Jun. 11, 1983 | [JP] | Japan | 58-103542 |
| Jun. 16, 1983 | [JP] | Japan | 58-91158[U] |
| Jun. 16, 1983 | [JP] | Japan | 58-91159[U] |
| Jun. 27, 1983 | [JP] | Japan | 58-97821[U] |
| Jul. 1, 1983 | [JP] | Japan | 58-101005[U] |
| Jul. 5, 1983 | [JP] | Japan | 58-103394[U] |

[51] Int. Cl.$^4$ .................................. B62K 15/00
[52] U.S. Cl. ........................ 280/278; 280/287; 403/97
[58] Field of Search ............ 280/278, 287, 639; 403/93, 97, 327, 330

[56] References Cited

U.S. PATENT DOCUMENTS

| 518,330 | 4/1894 | Ryan | 280/287 |
| 1,096,504 | 5/1914 | Grossman | 280/287 |
| 1,584,568 | 5/1926 | Clark | 280/278 |
| 3,512,816 | 5/1970 | Katano | 280/278 |
| 4,417,745 | 11/1983 | Shomo | 280/287 |

FOREIGN PATENT DOCUMENTS 977665  4/1951  France .......................... 280/287

Primary Examiner—David M. Mitchell
Assistant Examiner—Charles R. Watts
Attorney, Agent, or Firm—Parkhurst & Oliff

[57] ABSTRACT

A foldable bicycle frame includes a substantially vertical center tube at a mid portion of a bicycle frame, an upper center tube and a lower center tube to be partially fitted in upper and lower ends of the center tube, respectively. A front half of the bicycle frame includes the center tube and a rear half of the bicycle frame include the upper and lower center tubes, thereby enabling the front and rear halves to be folded or extended about the vertical center tube into a folded position or running position. The bicycle frame comprises radially annularly arranged continuous V-shaped teeth on connection surfaces of the upper and lower center tubes and the center tubes, and clamping means for clamping the center tube and the upper and lower center tubes in engagement with the teeth on the connection surfaces, thereby enabling the bicycle frame to be folded or extended by releasing and then clamping the center tubes. The bicycle frame according to the invention further comprises positioning means for positioning the front and rear halves in the folded and extended positions, lever means for fixing the halves by one operation, and locking means for the lever to avoid a risk of releasing the clamp of the halves when running.

17 Claims, 33 Drawing Figures

FIG_4
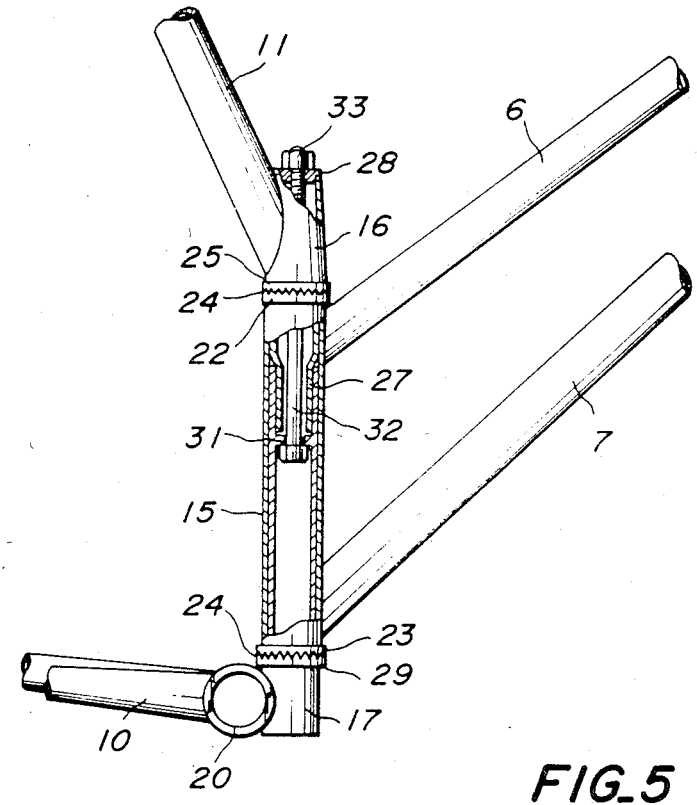
FIG_5
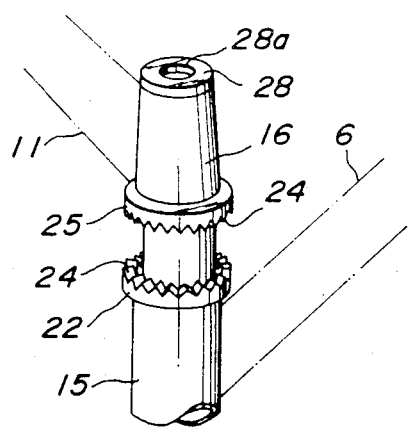

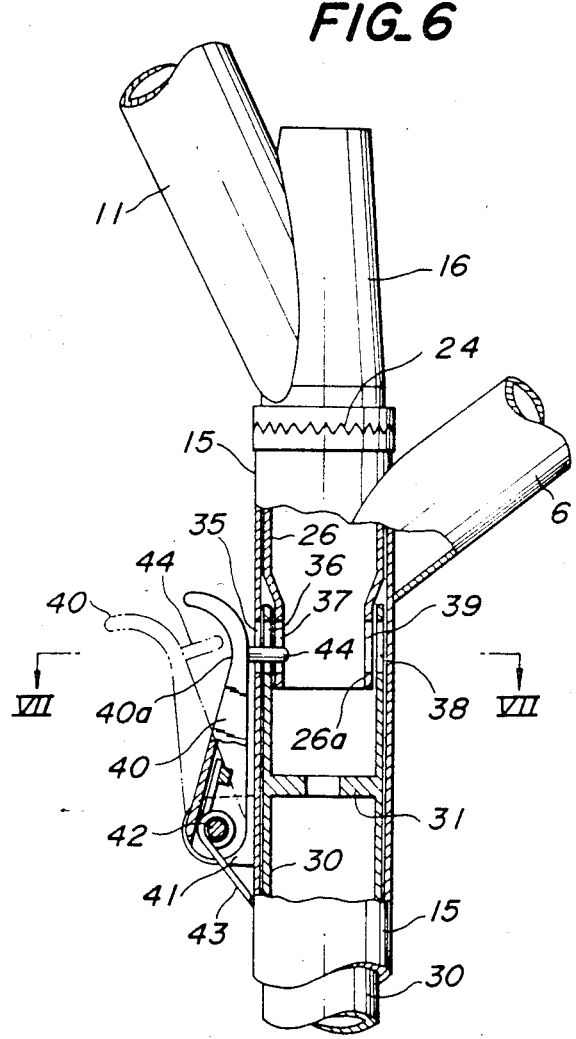
FIG_6
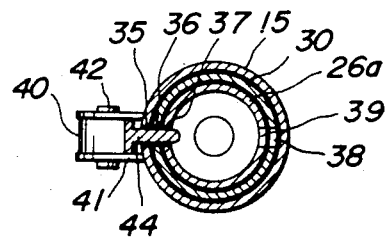
FIG_7

FIG_8
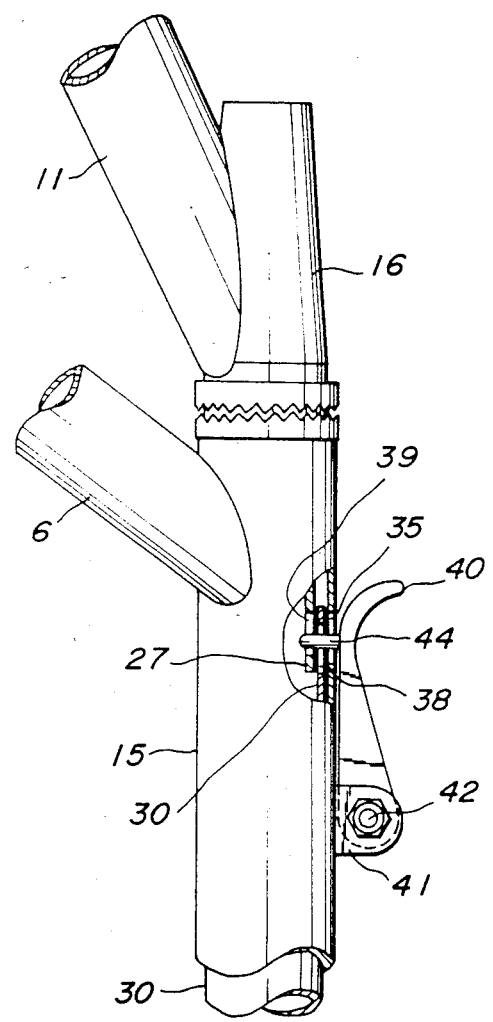

FIG_9
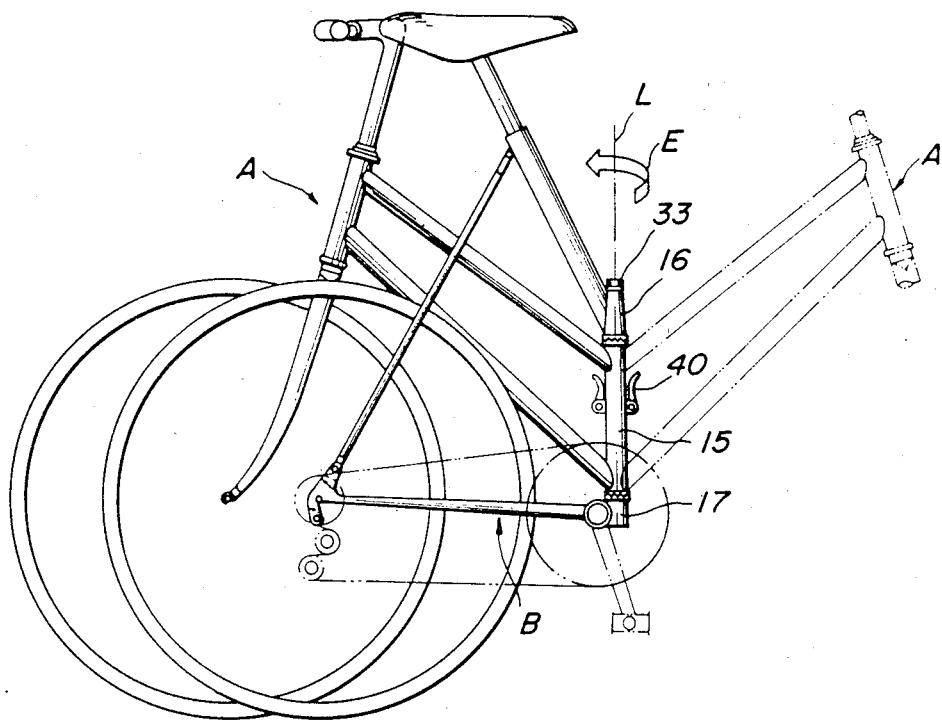

FIG_10
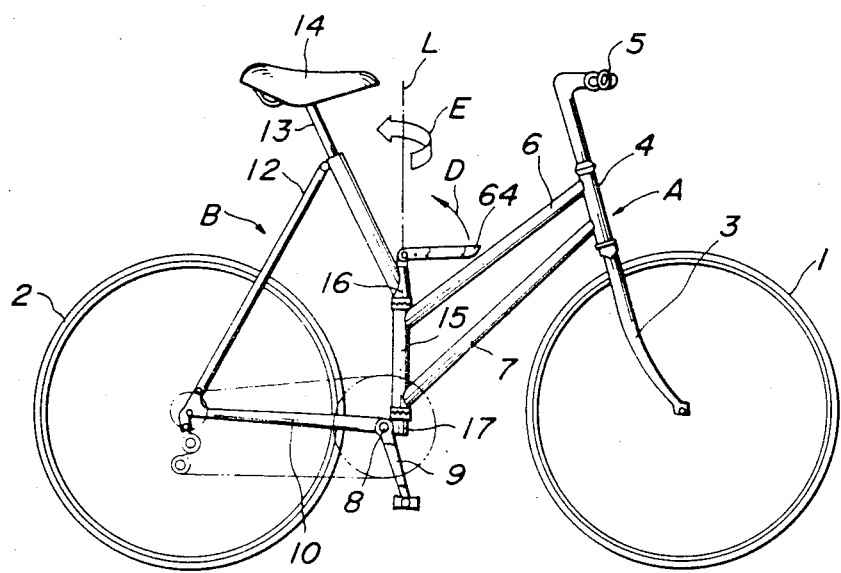

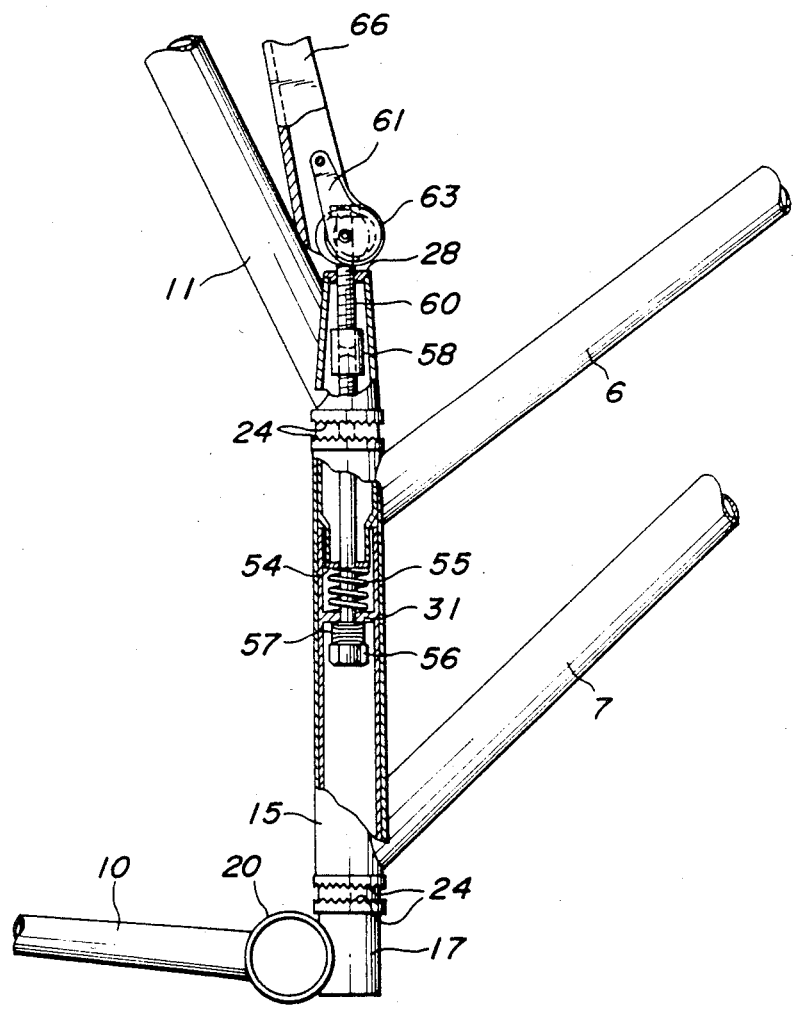
FIG_13

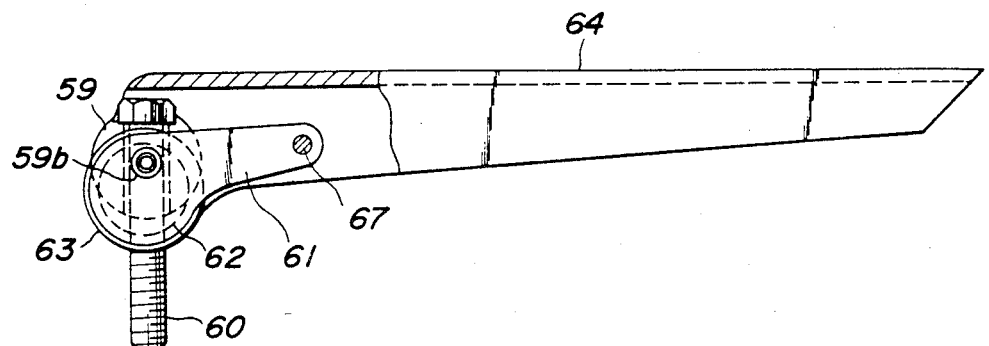
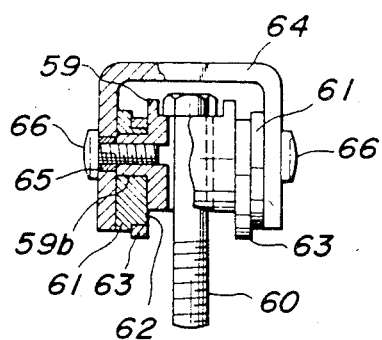
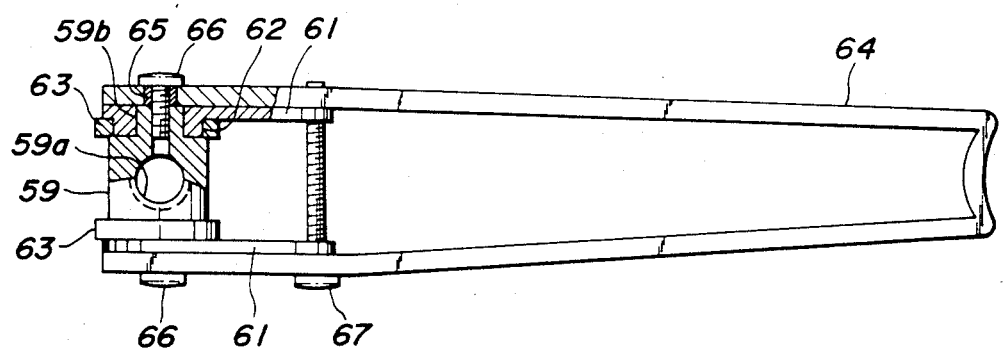

FIG_17a
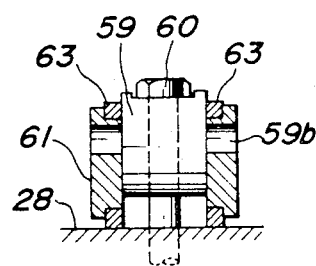
FIG_17b
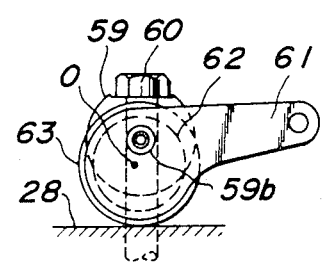
FIG_18a
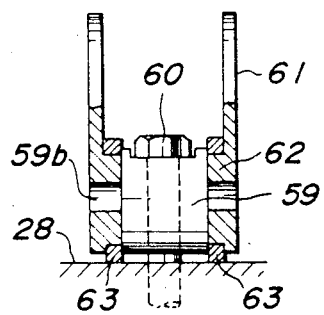
FIG_18b
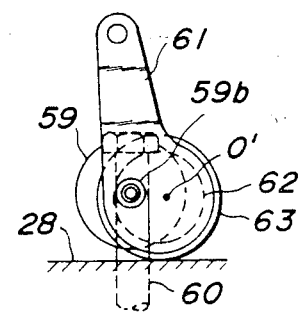

FIG_19
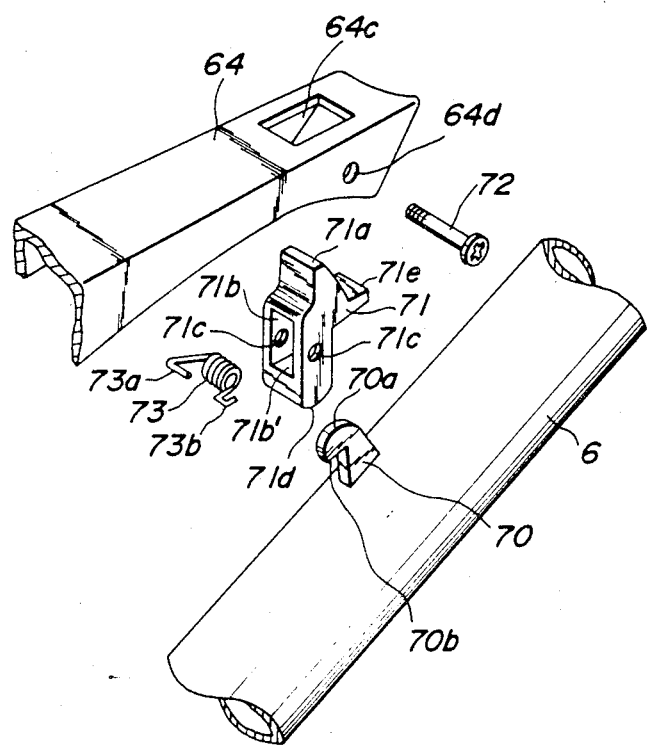

FIG_24

FIG_27
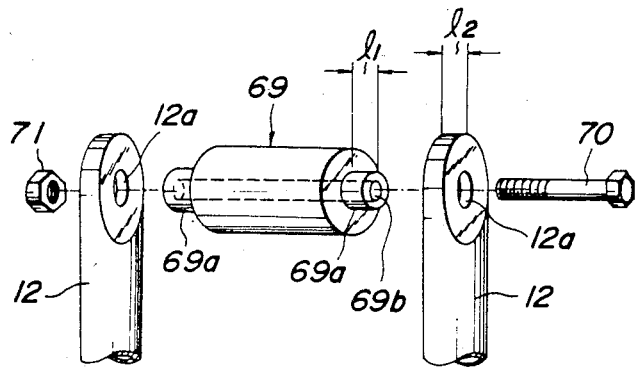
FIG_28
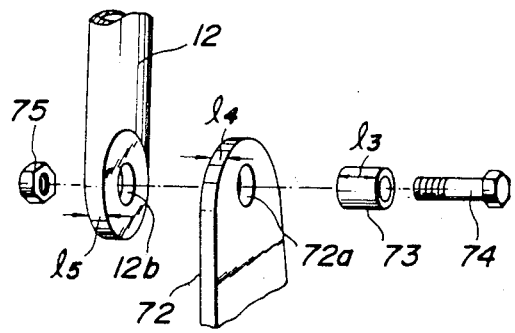

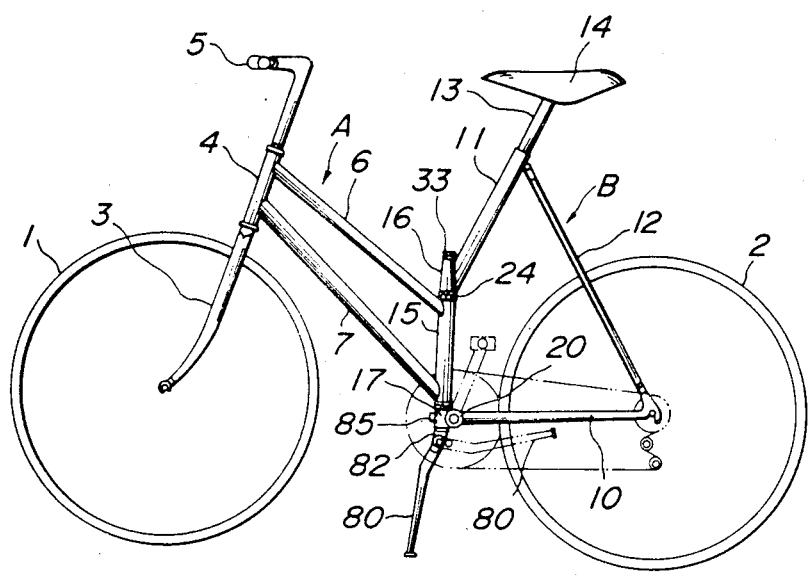
FIG_29

FIG_31
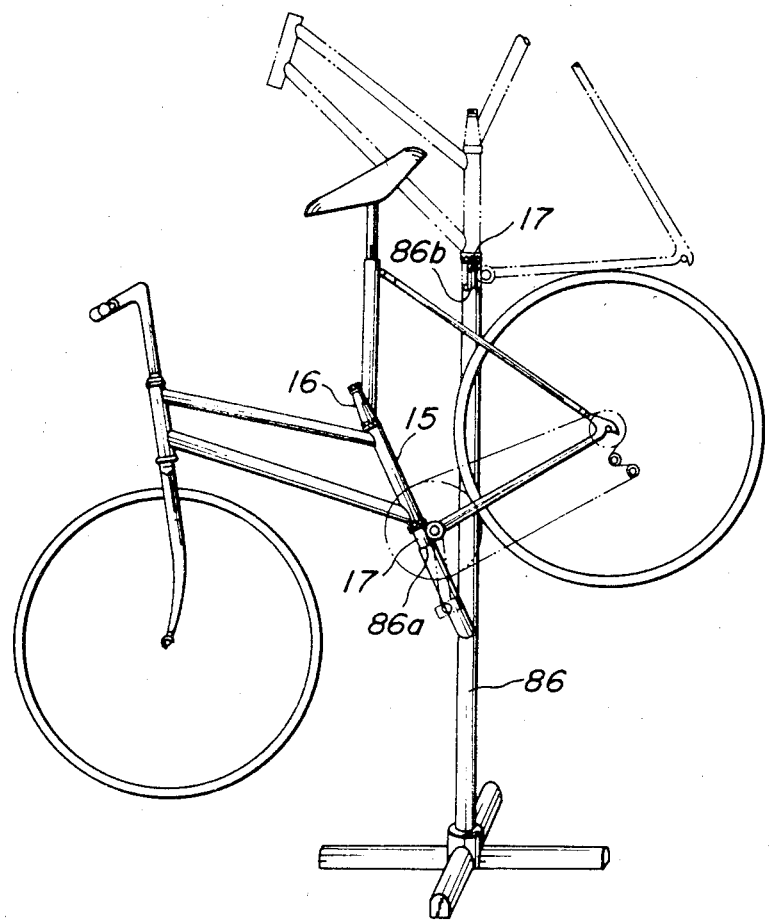

FOLDABLE BICYCLE FRAME

BACKGROUND OF THE INVENTION

1. Field of the Invention

This invention relates to an improvement of a foldable bicycle frame, and more particularly to a foldable frame of a portable sports bicycle.

2. Description of the Prior Art

Various kinds of foldable frames of portable sports bicycles have been proposed. In general, however, these hitherto used bicycle frames have disadvantages in that in assembling, disassembling and folding these frames, they require particular tools and troublesome and complicated operation requiring much time and great skill.

In these prior art bicycle frames, when they are folded or extended into a folded or running condition, it is difficult to ascertain whether halves of the frames assume desired positions to be eventually clamped. Moreover, complicated clamping operation is needed, for example, such as tightening nuts by spanners.

In the foldable bicycle frames of the prior art, furthermore, they do not have positive locking means for the halves of the frames, if not most. It is, therefore, very dangerous for a cyclist, if the clamping between the halves of the frame is accidentally released when running.

In the foldable bicycle frames of the prior art, as all frame members are rigidly fixed to each other so as not to permit any relative slight movement of the members, so that there is a tendency of compulsion forces to occur at the members when releasing the locking between the halves of the frame.

In the foldable bicycle frames of the prior art, moreover, a support bar or stay rod which supports a bicycle so as not to fall down when not used in a running condition is fixed to a chain stay by clamping by bolts, mounting plates and a washer which are respectively on lower and upper sides of the chain stay behind a bottom bracket. In other case, a support bar is fixed to a chain stay fork. In each case, the mounting of the support bar is comparatively troublesome and the mounting members are undesirably exposed to the outside which would spoil the beauty of the bicycle.

SUMMARY OF THE INVENTION

It is a primary object of the invention to provide an improved foldable bicycle frame which overcomes the above disadvantages of the prior art, and which is simply and easily folded only by loosening a fixing portion, without removing any parts, without using any particular tool and without spoiling the light-hearted construction and appearance, frame rigidity and durability.

In order to achieve this object, according to the invention a foldable bicycle frame comprises a substantially vertical center tube at a mid portion of a bicycle frame, an upper center tube and a lower center tube to be partially fitted in upper and lower ends of said center tube, respectively, to form a front half of the bicycle frame including said center tube and a rear half of the bicycle frame including said upper and lower center tubes, radially annularly arranged continuous V-shaped teeth on connection surfaces of said upper and lower center tubes and said center tubes, and clamping means for clamping said center tube and said upper and lower center tubes in engagement with said teeth on said connection surfaces, thereby enabling said bicycle frame to be foldable by releasing and then clamping said center tubes.

It is another object of the invention to provide a foldable bicycle frame capable of properly positioning halves of the frame in a running position and automatically setting the halves at a correct folded angle in folding.

For this purpose, the foldable bicyle frame according to the invention further comprises positioning means for positioning the front and rear halves in extended and folded conditions, the positioning means comprises the fitted portions of the upper and lower center tubes in the center tube, the fitted portions being fitted with each other, the center tube and the fitted portions being formed with elongated slots respectively aligned with each other in extended and folded positions of the bicycle frame, a lever pivotally mounted to the center tube in a manner in which a free end of the lever is in opposition to the elongated slot of the center tube, a positioning pin secured to the free end of the lever so as to pass through the elongated slots aligned in the extended and folded positions, and urging means for normally urging the lever toward the center tube.

It is further object of the invention to provide a foldable bicycle frame capable of simply and easily clamping halves of the frame in a running position or a folded position only by a single operation and capable of securely locking the halves in the clamped positions.

In order to achieve this object, with the foldable bicycle frame according to the invention, the clamping means comprises an intermediate disc integral with the lower center tube and formed with a bolt-passing aperture substantially at its center, a lower disc integral with the upper center tube and formed with a bolt-passing aperture substantially at its center, a spring located in compression between the intermediate and lower discs, a bolt extending through the intermediate and lower discs beyond the upper center tube, a lever pivotally secured to an upper end of the bolt extending above the upper center tube, at least one cam interlocked with the lever and engaging the upper center tube so that pivotal movement of the lever causes the engagement of the teeth to be clamped and released.

According to the invention, moreover, the lever comprises locking means which comprises an anchoring member in the form of a hook provided on the bicycle frame at a location where a free end of the lever is adjacent thereto when clamped, a lock member pivotally mounted on the lever and having a projection extending through an opening formed in an upper surface near to the free end and an opening formed in an intermediate portion of the lock member and engaging the anchoring member, and urging means for urging the lock member against the anchoring member into engagement with each other.

In a preferred embodiment of the invention, upper ends of seat stays are pivotally connected to a seat tube integral with the upper center tube and lower ends of the seat stays are pivotally connected to rear ends of chain stays.

In a further preferred embodiment of the invention, the frame further comprises a support bar supporting the bicycle frame against falling down, a bracket for supporting the support bar pivotably into its operative position and inoperative position, the bracket being provided on its upper portion with a shaft portion capable of detachably fitting in a lower opening of the lower center tube, and fastening means for fixing the bracket to the lower center tube.

BRIEF DESCRIPTION OF THE DRAWINGS

In order that the invention may be more clearly understood, preferred embodiments will be described, by way of example, with reference to the accompanying drawings wherein:

FIG. 4 is a partially sectional side view of the main parts of the frame shown in FIG. 3;

FIG. 5 is a perspective view of engaging teeth of the main parts of FIG. 4;

FIG. 6 is a partially sectional side view of main parts of a preferred embodiment of the invention;

FIG. 7 is a cross-sectional view taken along the line VII—VII in FIG. 6;

FIG. 8 is a view for explaining the operation of the parts shown in FIG. 6;

FIG. 9 is a view for explaining the operation of a bicycle equipped with positioning means according to the invention;

FIG. 10 is a side view of a bicycle equipped with lever means for fixing and releasing havles of a frame according to the invention;

FIG. 13 is an elevation for explaining the operation of the main parts in FIG. 12;

FIG. 14 is a side view illustrating a lever and a cam mechanism in partially cross-section;

FIG. 15 is a front elevation illustrating the parts in section shown in FIG. 14;

FIG. 16 is a bottom plan view of those shown in FIG. 14;

FIG. 17a is a partially sectional front view of the cam mechanism in a fixed condition shown in FIG. 14;

FIG. 17b is a side view of the cam mechanism shown in FIG. 17a;

FIG. 18a is a partially sectional front view of the cam mechanism in a released condition;

FIG. 18b is a side view of the cam mechanism;

FIG. 19 is an exploded perspective view of locking means used in the bicycle frame according to the invention;

FIG. 27 is an exploded perspective view illustrating the connecting construction at the upper end of the seat stay;

FIG. 28 is an exploded perspective view illustrating connecting construction at the lower end of the seat stay;

FIG. 29 is a side view of a bicycle having a support bar according to the invention;

FIG. 31 is a view illustrating the bicycle shown in FIG. 29 mounted on a stand for exhibition.

DETAILED DESCRIPTION OF THE PREFERRED EMBODIMENT

Figure 1:
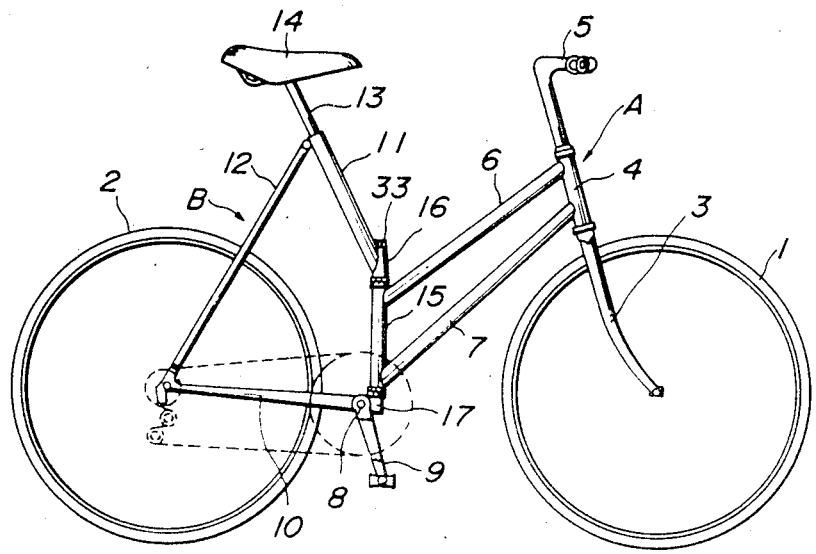
FIG. 1 is a side elevation illustrating a bicycle as a whole having a bicycle frame according to the invention.

Referring to FIGS. 1-5 illustrating a bicycle to which one embodiment of the invention is applied, which comprises a front wheel 1, a rear wheel 2, fork blades 3, a head tube 4, handle bars 5, an upper front tube 6, a lower front tube 7, a bottom bracket spindle 8, a crank 9, chain stays 10, a seat tube 11, seat stays 12, a seat pillar 13 and a saddle 14.

According to the invention, a bicycle frame is provided at a mid portion with a substantially vertical center tube 15, an upper center tube 16 fitted in an upper end of the center tube 15 and a lower center tube 17 fitted in a lower end of the center tube 15. To an upper portion of the center tube 15 is connected a rear end of the upper front tube 6, and to a lower portion of the center tube 15 is connected a rear end of the lower center tube 7 to form a front half A of the bicycle frame.

Figure 3:
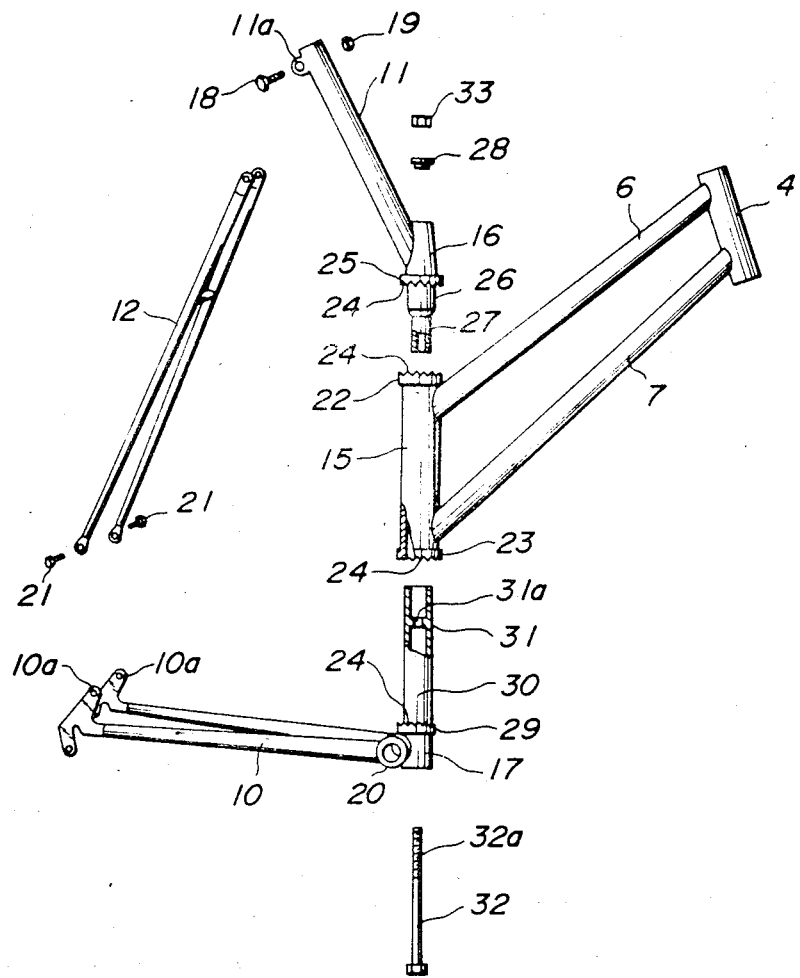
FIG. 3 is an exploded view illustrating the constitution of the bicycle frame according to the invention.
Figure 11:
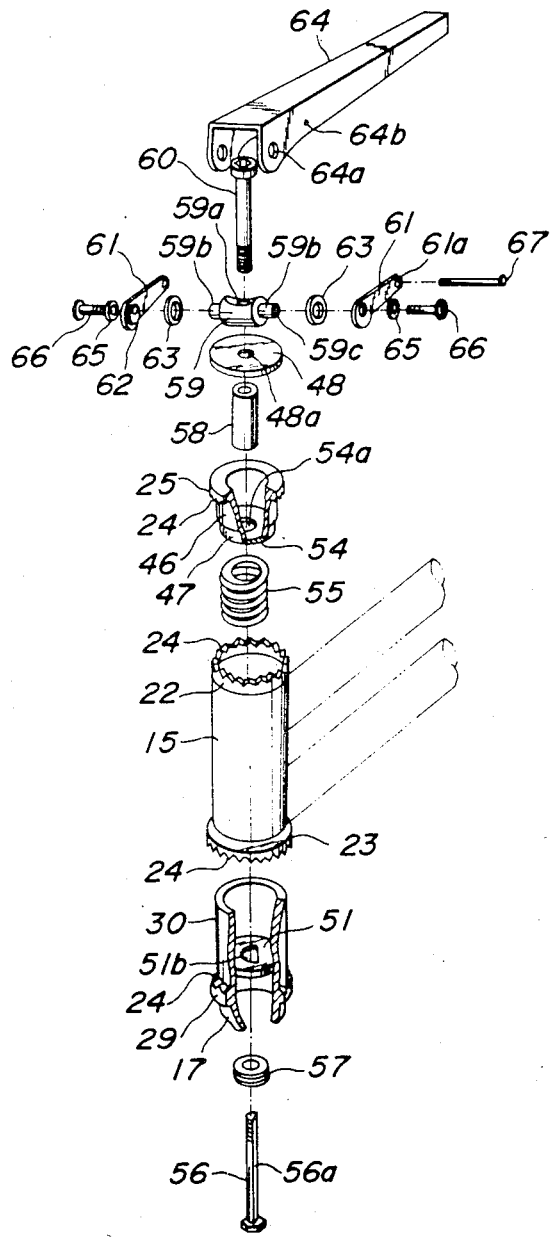
FIG. 11 is an exploded perespective view of main parts of the frame shown in FIG. 10.

To the upper center tube 16 is connected a lower end of the seat tube 11 which is provided at an upper end with a rearward extending bracket 11a to which is connected upper ends of the seat stays 12 by means of a bolt 18 and a nut 19 as shown in FIG. 3.

To a rear face of the lower center tube 17 is connected front ends of the chain stays 10 having thereat a bottom bracket 20 as shown in FIG. 3. Fork ends of the chain stays 10 are formed with threaded apertures 10a to which are connected lower ends of the seat stays 12 by means of bolts 21 to form a rear half B of the bicycle frame.

As shown in detail in FIGS. 3-5, end surfaces of upper end lower flanges 22 and 23 of the center tube 15 are formed with continuous V-shaped teeth 24 radially arranged. An end surface of a lower flange 25 of the upper center tube 16 is formed with continuous V-shaped teeth 24 adapted to mesh with the teeth 24 of the center tube 15. The upper center tube 16 is formed at its lower end with a downward extending cylindrical portion 26 adapted to be fitted in the center tube 15 and with a downward extending contracted cylindrical portion 27 which is continuously integrally formed with the cylindrical portion 26 and has a smaller diameter than that of the cylindrical portion 26. An upper cap 28 having a bolt passing aperture 28a is fixed to an upper end of the upper center tube 16. Moreover, an end surface of an upper flange 29 of the lower center tube 17 is formed with continuous V-shaped teeth 24 adapted to be in mesh with the teeth 24 at the lower flange 23 of the center tube 15. The lower center tube 17 is formed at its upper end with an upward extending cylindrical portion 30 adapted to be fitted in the center tube 15. A bolt seat 31 having a bolt passing aperture 31a is fixed to the inside of cylindrical portion 30.

In assembling the halves A and B of the frame, after the cylindrical portions 26, 27 and 30 of the rear half B have been inserted from upper and lower sides into the center tube 15 of the front half A, a bolt 32 is inserted into the lower center tube 17 from its underside so as to extend through the passing apertures 31a of the seat 31 and 28a of the cap 28, and then a nut 33 is threadedly engaged on an upward extending screw portion 32a of the bolt 32.

With the bicycle frame constructed as above described according to the invention, only by loosening the nut 33, the front and rear halves A and B of the frame can be freely rotated about a center axis L (FIG. 2) of the center tubes 15, 16 and 17 as shown by an arrow C. Namely, when the nut 33 is loosened so as to be retracted by a distance more than twice of a height of the V-shaped teeth 24 and then the front and rear halves are rotated relative to each other as shown by the arrow C in FIG. 2 to move the upper and lower center tubes 16 and 17 away from the center tube 15 by an interaction between oblique faces of the V-shaped teeth 24 or a wedge action of the teeth 24 so as to release the engagement of the teeth 24. In this case, moreover, the rear half B of the frame sufficiently accommodates the slight upward and downward movements of the upper and lower center tubes 16 and 17 because the seat stays 12 are connected by the bolts 18 and 21 at their upper and lower ends to the rear half B of the frame.

In order to bring the bicycle comprising the foldable frame according to the invention into a used or running condition, the front and rear halves A and B are brought into a straight or extended state as shown in FIG. 1 and then the nut 33 is tightened up. By tightening up the nut 33, the upper and lower center tubes 16 and 17 are brought into close contact with the intermediate center tube 15, so that the upper and lower continuous V-shaped teeth 24 are completely closely engaged with each other, respectively to form a complete unitary frame of the front and rear halves A and B.

Figure 2:
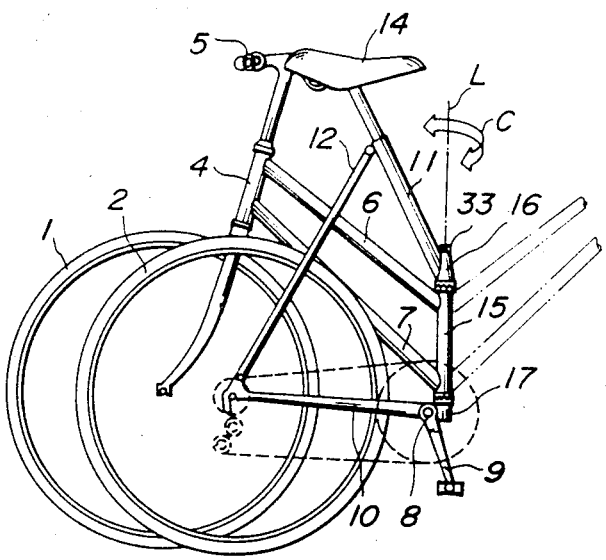
FIG. 2 is a side view of the bicycle of FIG. 1, illustrating its folded condition.

In order to fold or collapse the bicycle frame, after the nut 33 has been loosened, any one of the front and rear halves A and B is rotated about the center line L relative to each other as shown in FIG. 2. For the purpose of clamping this folded condition, only the nut 33 is tightened.

The foldable bicycle frame constructed as above described has the following advantages.

(1) The bicycle frame according to the invention comprises the front half A of the frame having the center tube 15 into which are telescopically inserted the cylindrical portions of the upper and lower center tubes to bring the continuous V-shaped teeth 24 formed in connection flanges of these center tubes into engagement with each other and the bolt 32 and the nut 33 for clamping these engaged center tubes, thereby requiring only one clamping portion to make the operation simple and easy. In folding or collapsing the frame, only loosening the bolt 32, the front and rear halves can be rotated about the axis L without requiring any removal of other parts so that the frame can be folded or collapsed simply, easily and instantaneously. The operation for bringing the frame into the operative or extended condition is also effected in the similar manner.

(2) Since the continuous V-shaped teeth formed in the center tube 15 of the front half and the upper and lower center tubes 16 and 17 are radially arranged so that the axes of the center tubes are always brought into alignment with each other only by clamping the cylindrical portions of the upper and lower center tubes vertically. Any play and misalignment do not occur in the fixed frame.

(3) The center tube 15 of the front half and upper and lower center tubes 16 and 17 are concentrically connected to each other at the intermediate portion of the bicycle, so that a light or light-hearted appearance required for a sports bicycle is not spoiled at all, although it is foldable.

FIGS. 6-9 illustrate another preferred embodiment of the invention, wherein a bicycle frame comprises positioning means for exactly positioning front and rear halves of the frame in bringing them into an extended or running position and a folded position.

In this embodiment in the same manner as the first embodiment, front half A and rear half B of a bicycle frame are relatively pivotally moved about a center connection comprising a center tube 15 and cylindrical portions 26a and 30 of upper and lower center tubes fitted with each other. The center tube 15 of the front half A is formed in its side with a longitudinally elongated slot or aperture 35. The cylindrical portions 26a and 30 are adapted to be fitted with each other in the center tube 15 and formed in their sides with elongated slots or apertures 36 and 37, respectively, and aligned with the slot 35 of the center tube 15, when the bicycle frame is extended or under a straight condition. The cylindrical portions 26a and 30 are further formed in their sides with elongated slots 38 and 39, respectively, and aligned with the slot 35 when the frame is under a properly folded condition. A lever 40 is pivotally mounted at its one end by means of a pin 42 to a bracket 41 extending from the center tube 15 in a manner that a knock pin or positioning pin 44 formed on a free end of the lever 40 can be inserted into the elongated slot 35 and the elongated slots 36, 37, 38 and 39 aligned with the slot 35. A spring 43 coiled about the pin 42 always urges the lever 40 against the center tube 15.

The operation of this embodiment will be explained hereinafter. When the front half A of the frame is brought into the straight condition with the rear half B as shown in FIG. 6 and in phantom lines in FIG. 9, the positioning pin 44 automatically extends into the elongated slots 35, 36 and 37 with the aid of the spring 43, thereby easily set the bicycle frame in the straight position. By tightening the nut 33, the proper straight or running condition of the bicycle frame can easily be obtained.

In case of folding or collapsing the bicycle frame, the nut 33 is first loosened and the positioning pin 44 is then retracted or withdrawn from the elongated slots 35, 36 and 37 by pivotally moving the lever 40 away from the center tube 15. Thereafter, the front half A of the frame is rotated about the axis L as shown by an arrow E in FIG. 9. In this manner, when the relative angle between the front and rear halves becomes a suitable folded angle, the positioning pin 64 automatically extends into the elongated slots 35, 38 and 39 with the aid of the spring 43, because the elongated slot 35 is aligned with the slots 38 and 39 at the suitable folded angle as shown in FIG. 8, thereby maintaining the halves A and B in the suitable folded position. Accordingly, the nut 33 need not be tightened.

In order to bring the bicycle from this folded condition into the extended or running condition, the lever 40 is raised away from the center tube 15 to retract or withdraw the positioning pin 44 from the elongated slots 39, 38 and 35 and thereafter the front half A is rotated forward, thereby automatically setting the bicycle frame in the straight condition.

The positioning means constructed as above described has the following advantages.

(1) The positioning means according to the invention is capable of automatically detecting and positioning a proper extended or running position in the extending operation of the bicycle frame, thereby facilitating the extending operation.

(2) Moreover, the positioning means according to the invention is capable of positioning the suitable folded position and automatically fixing the bicycle frame in the folded condition to facilitate handling the bicycle frame such as transporting it in the folded condition.

(3) The front and rear halves are fixed in the extended condition by means of the positioning pin passing through the elongated slots of tubes in addition to the V-shaped teeth engaged by clamping the bolt and nut, to improve the safety of the bicycle in running.

In the above embodiments of the foldable bicycle frame, however, an operator has to rotate the nut 33 many times by a spanner or wrench to tighten or untighten it in fixing or releasing the front and rear halves A and B of the bicycle frame. This operation may require much time.

The following embodiment shown in FIGS. 10-18 overcomes this problem, wherein the fixing and releasing of the halves of the frame are effected in one operation by raising or lowering a lever 64. In the drawings, the same parts have been designated by the same reference numerals as in the above embodiments.

In this embodiment, an inner disc 51 provided in a cylindrical portion 30 integral with the lower center tube 17 is formed centrally with a semicircular aperture 51b in the form of a half-moon. On the other hand, a cylindrical portion 47 integral with an upper center tube 16 is provided at its lower end with a lower disc 54 formed in its center with a bolt passing aperture 54a.

A coil spring 55 is arranged in compression between an intermediate disc 51 integral with a lower center tube 17 and the lower disc 54 integral with the upper center tube 16. A bolt 56 is formed on one side of its shank with a flat portion 56a adapted to be fitted in the half-moon aperture 51b of the disc 51 and is inserted from a lower side of the lower center tube through dish-shaped springs 57 into the aperture 51b, coil spring 55 and the bolt passing aperture 54a. A connecting nut 58 is threadedly engaged with an upper threaded end of the bolt 56.

A lever pivotal member 59 is formed with a vertical bolt passing aperture 59a and on both sides with short shafts 59b centrally formed with screw threaded apertures 59c. A bolt 60 is inserted through the aperture 59a and an aperture 48a of an upper cover 48 of the upper center tube 16 into the tube 16 and is threadedly engaged in the connecting nut 58 to be connected to the bolt 56.

On each of the short shafts 59b are fitted an eccentric cam 62 formed integrally with an arm 61 and a ring 63 rotatably in a manner in which an outer periphery of the ring 63 is in contact with an upper surface of the upper cover 48.

A lever 64 having an inverted V-shaped cross-section is formed in its enlarged end with apertures 64a into which bushings 65 are fitted. Into each aperature 64a, a set screw 66 is inserted through the bushing 65 into the threaded aperture 59c of the short shaft 59b so as to be threadedly engaged therewith. A set screw 67 extends through apertures 64b formed in the lever 64 and apertures 61a formed in the respective arms 61 to connected the arms 61 to the lever 64.

The operation of the arrangement above described will be explained hereinafter.

Figure 12:
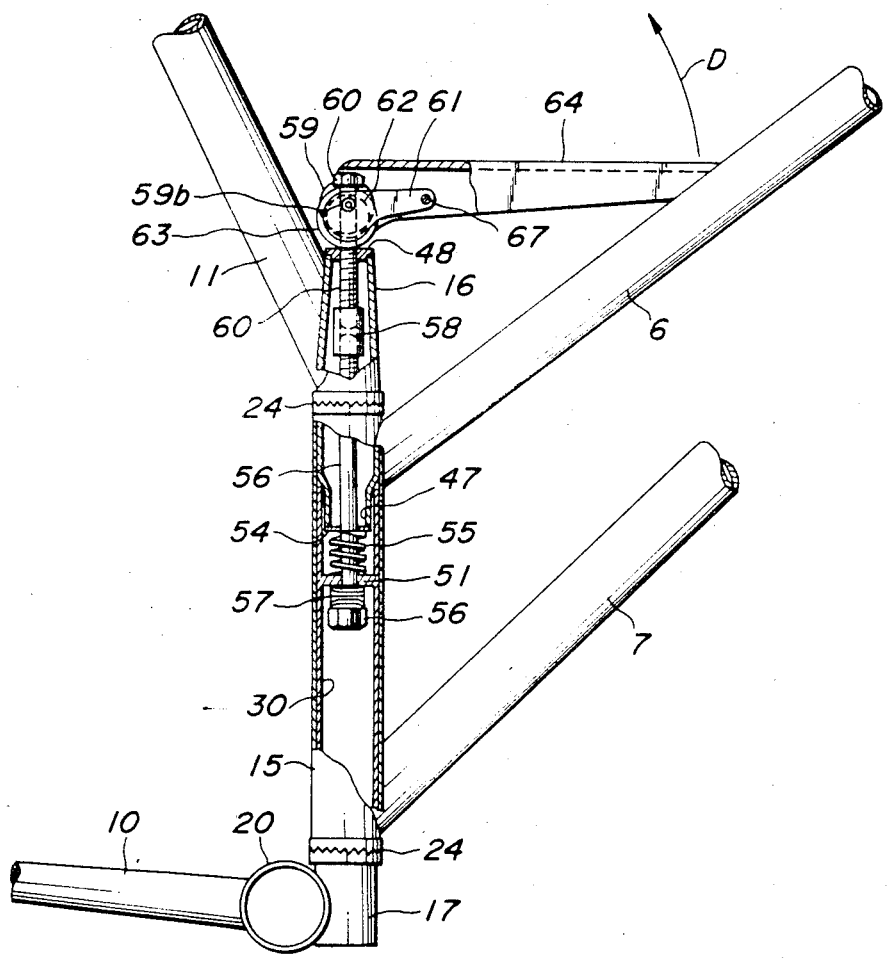
FIG. 12 is a partially sectional side view illustrating an assembled condition of the main parts of FIG. 11.

FIGS. 10 and 12 illustrate the lever 64 which has been moved into the front direction or in a horizontal position wherein the front and rear halves A and B of the frame are fixed in a straight or aligned condition. In this case, the connecting bolts 60 and 56 have been raised through rings 63 by an action of the eccentric cams 62, so that the upper and lower center tubes 16 and 17 have been moved toward each other against the force of the spring 55 to be urged against the center tube 15, respectively. The urging force against the center tube 15 is determined by a reaction force resulting from the dish-shaped springs 57. In order to adjust the urging force, therefore, an overall length of the bolts 60 and 56 is previously adjusted into a suitable length.

In this manner, the suitable urging force acts between the upper and lower center tubes 16 and 17 respectively and the center tube 15, so that the continuous V-shaped teeth 24 are completely engaged with each other so as to permit the front and rear halves A and B of the frame to be securely fixed to each other.

In order to prevent the lever 64 from being returned by the spring forces of the spring 55 and the dish shaped springs 57 when the lever 64 is in the fixing position shown in FIGS. 10 and 12, a center O of each the eccentric cam 62 should be set in a position somewhat beyond a lower dead point (or the position slightly shifted to the left).

When it is desired to fold the bicycle, the lever 64 is raised from the horizontal position shown in FIGS. 10 and 12 in a direction shown by an arrow D. When the lever 64 is raised, the arms 61 fixed to the lever by the screws 47 are also rotated from the position shown in FIG. 17b to a position shown in FIG. 18b. As a result the eccentric cams 62 respectively integral with the arms 61 are rotated about the shafts 59b from the position shown in FIG. 17b to the position shown in FIG. 18b, so that the center O of each the eccentric cam 62 moves to the position O' shown in FIG. 18b. Accordingly, the upper center tube 16, which has been urged through the upper cover 48 against the ring 63, rises relative to the center tube 15 with the aid of the coil spring 55 and the lower center tube 17 lowers relative to the center tube 15 with the aid of the coil spring 55 to release the engagement of the V-shaped teeth 24 as shown in FIG. 13. Under this condition, the front half A is rotated about the center line L in the direction shown by the arrow E in FIG. 10 to fold the bicycle frame. By rotating the lever 64 to the horizontal locking position under this condition, the folded front and rear halves are fixed to each other.

In other words, according to this embodiment, only by rotating the lever 64 into the horizontal or vertical position, the front and rear halves A and B can be fixed to each other with the aid of the V-shaped teeth 24 or released from their fixation. In this embodiment, therefore, one operation of the lever 64 so as to be into the horizontal or vertical position can simply and rapidly fix or release the front and rear halves of the bicycle, thereby providing a very convenient bicycle.

In this embodiment, moreover, the rings 63 are slidably fitted on the outer circumferences of the eccentric cams 62, so that outer circumferences of the rings 63 are substantially in rolling contact with the upper surface of the upper cover 48 and inner circumferences of the rings 63 slide on the outer circumferences of the eccentric cams 62, with the result that the resistance in cam action becomes small and frictional wear at contacting members greatly decreases, thereby ensuring smooth operation of the lever and improvement of the device's durability.

In this embodiment, furthermore, dish-shaped springs 57 are interposed between the head of the bolt 56 and the intermediate disc 51, so that the urging forces between the V-shaped teeth 24 in the fixed condition of the halves are obtained by the strong reaction of the dish-shaped springs 57 to ensure the fixation between the front and rear halves A and B.

In this embodiment, moreover, the bolt 56 is formed in its one side with a flat surface so as to be restrained against rotation relative to the intermediate disc 51 and the bolts 56 and 60 are connected with each other through the connecting nut 58, thereby easily adjusting the overall length of the bolts by rotating the bolt 60. Furthermore, such an adjustment of the bolt length can simultaneously adjust the above fixation force, so that the adjustment as a whole can be easily effected.

In the embodiment, the lever 64 is not shown to include any locking means for clarity. It is very dangerous for a cyclist, if the lever is accidentally moved in the direction as shown by the arrow D so as to release the fixation between the front and rear halves A and B of the bicycle frame when the bicycle is running in the condition as shown in FIG. 10.

FIGS. 19-23 illustrate a further embodiment of the invention comprising locking means for the lever 64 to prevent the release of the fixation between the front and rear halves, wherein like members have been designated by the same reference numerals as in the previous embodiments.

An upper front tube 6 is provided with an anchoring member 70 in the form of a hook including a round head 70a and a downward directing jaw 70b at a location adjacent to a front end of the lever 64 under the fixing position. The lever 64 has of course cams and serves to fix or release continuous V-shaped teeth 24 in opposition to each other at relative rotative portions of a center tube 15 and upper and lower center tubes 16 and 17. The lever 64 is formed with a rectangular opening 64c in its upper surface near its front end and with apertures 64d in side walls.

A lock member 71 is integrally formed so as to have a protrusion 71a extending through the opening 64c and at its mid portion an opening 71b extending in an axial direction of the lever 64 in assembled condition and adpated to receive and engage the jaw 70b of the anchoring member 70. The lock member 71 is further formed with apertures 71c passing through sidewalls of the opening 71b. A reference numeral 71b' denotes a bottom of the opening 71b. A lower end 71d of the lock member 71 is so curved that the lock member 71 is pivotally moved in a clockwise direction as viewed in FIG. 20 when the lower end 71d engages the round head 70a of the lock member 71. Moreover, the lock member 71 is formed with a projection 71e serving as a stopper. The lock member 71 is inserted in the front end portion of the lever 64 with the protrusion 71a of the lock member 71 extending through the rectangular opening 64c of the lever 64. A set screw 72 passes through the apertures 64d of the lever 64, the apertures 71c of the lock member 71 and a coil spring 73 located in the opening 71b of the lock member 71 so that the lock member 71 is supported by lever 64 pivotally movably relative thereto and urged against the anchoring member 70 into an engagement therewith by the action of the coil spring 73. To this end, one end 73a of the coil spring 73 engages an inner surface of the lever 64 and the other end 73b of the coil spring 73 engages the lock member 71 so as to normally pivotally urge the lock member 71 as shown by an arrow F in FIG. 20.

Figure 20:
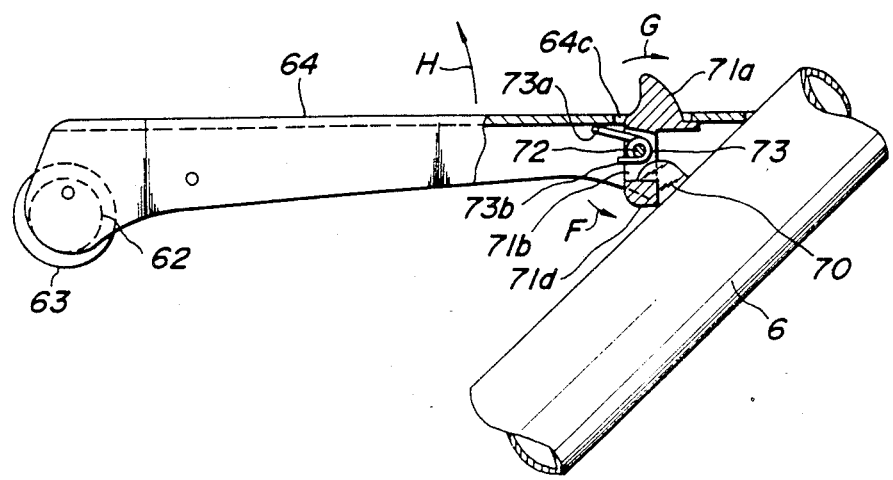
FIG. 20 is a partially sectional side view of the locking means in a locking condition shown in FIG. 19.
Figure 21:
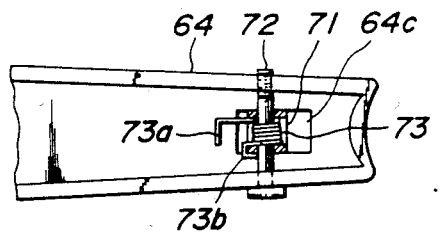
FIG. 21 is a partial bottom plan view of the lever shown in FIG. 20.

The operation of the locking means constructed as above described will be explained hereinafter. When the lever having the locking means is moved forward or into the horizontal position, the lower end 71d of the lock member 71 contacts the round head 70a of the anchoring member 70. When the lever 64 is further moved downward, the lock member 71 lowers rotating in the direction shown by an arrow G in FIG. 20. At a moment when the bottom 71b' of the opening 71b moves beyond the jaw 70b of the anchoring member 70, the lock member 71 pivotally moves in the direction shown by the arrow F into engagement with the anchoring member 70 as shown in FIG. 20. Accordingly, the lever 64 does not return in the direction shown by the arrow H in FIG. 20 unless the lock member 71 disengages from the anchoring member 70.

Figure 22:
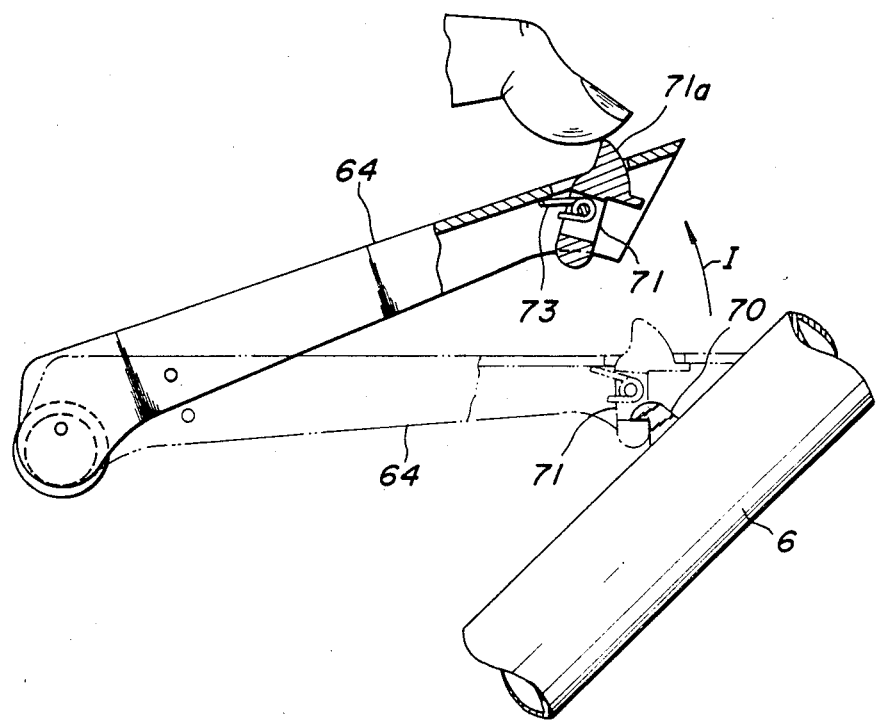
FIG. 22 is a side view for explaining the operation for releasing the locking means.

When it is desired to release the lever 64, the protrusion 71a of the lock member 71 is urged inwardly of the lever 64 by a fingertip so as to rotate against the action of the coil spring 73 in a clockwise direction as viewed in FIG. 22 to disengage the lock member 71 from the anchoring member 70. Thereafter the lever 64 is raised in the direction shown by an arrow I in FIG. 22.

The locking means constructed as above described has the following advantages.

(1) The locking means can be operated only by moving the lever downward in the front direction. The locked lever is not released unless the lock member of the locking means is actuated, so that there is no risk of releasing the fixation of the foldable bicycle by accidentally releasing the lever in running.

(2) When the locking means is operated, a sound is caused by the spring, so that by hearing the sound the actuation of the locking means can easily be confirmed.

Figure 23:
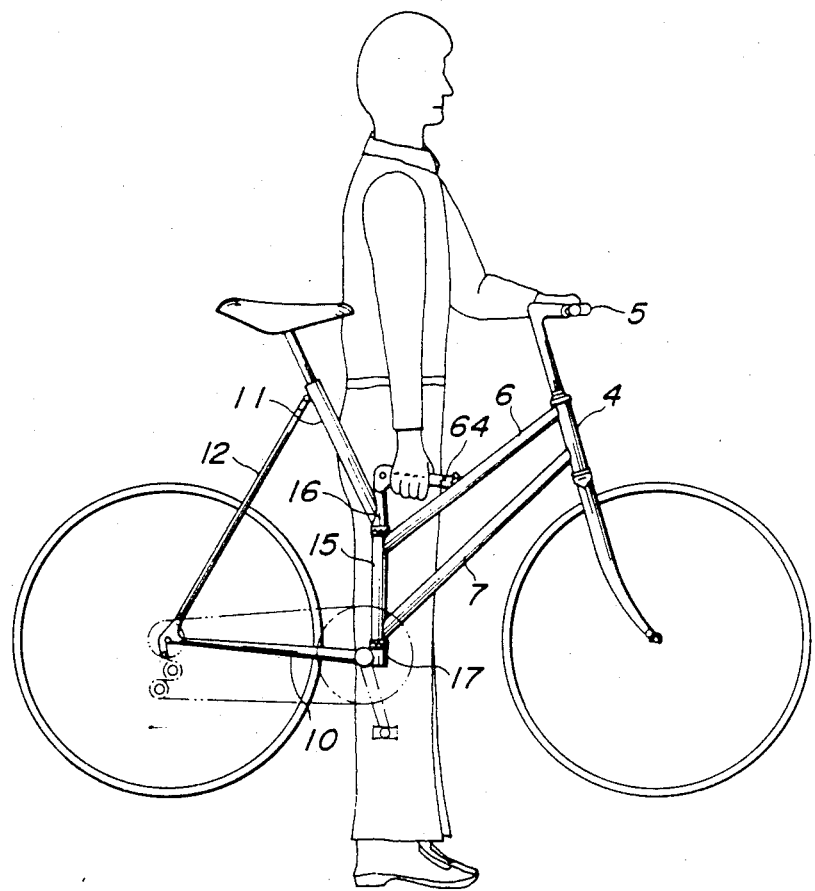
FIG. 23 is a side view illustrating a cyclist carrying a bicycle in his hand gripping the locked lever in FIG. 20.

(3) The locking means is not released unless the protrusion of the lock member is pushed, so that a cyclist can carry the bicycle in his hand gripping the locked lever as shown in FIG. 23. The lever also serves as a handle for carrying the bicycle.

Figure 24:
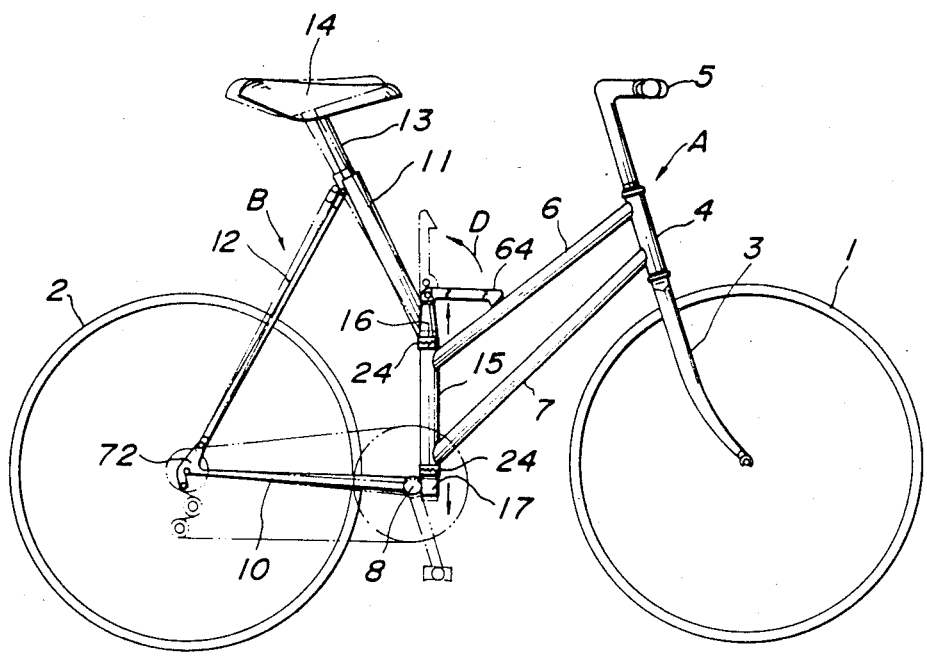
FIG. 24 is a side view of a bicycle of a preferred embodiment of the invention having particular seat stays.
Figure 25:
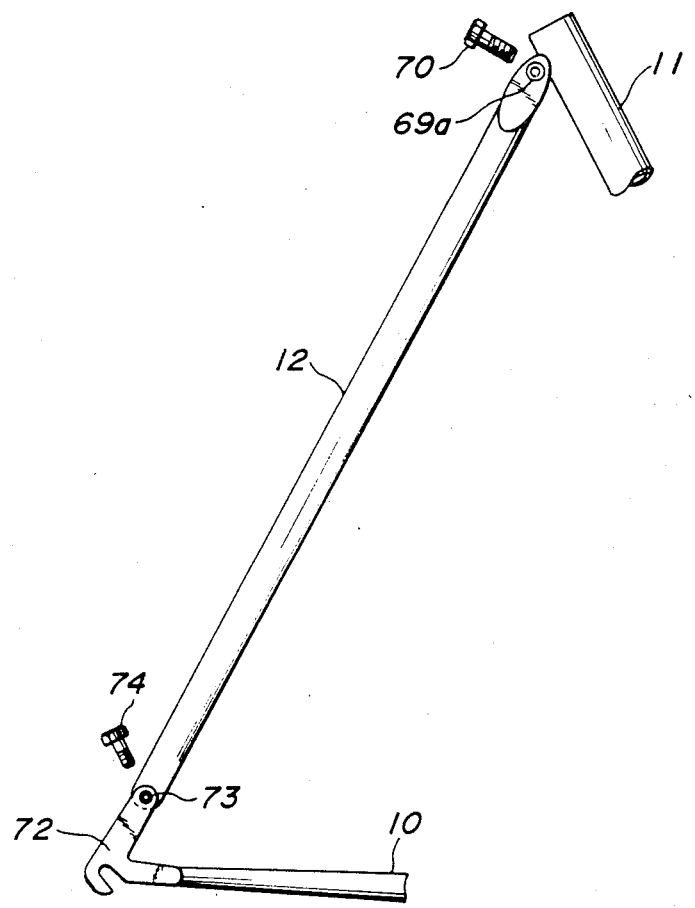
FIG. 25 is a side view of the seat stay shown in FIG. 24.
Figure 26:
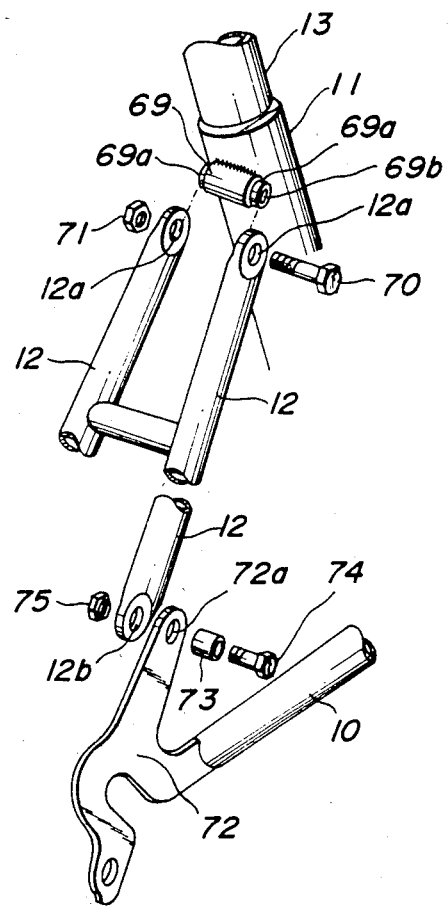
FIG. 26 is an exploded perspective view illustrating connections of the seat stay shown in FIG. 25.

With the foldable bicycle in the above embodiments, when the V-shaped teeth 24 are released, the upper and lower center tubes 16 and 17 should be somewhat moved upward and downward, respectively, releative to the center tube 15 so that the rear half B of the frame should be somewhat deformed from the position shown in solid lines to the position shown in phantom lines in FIG. 24. If the seat stays 12 are completely fixed at their ends to the other frame members, therefore, the rear half B of the frame cannot be deformed as shown in the phantom lines in FIG. 24.

A next embodiment shown in FIGS. 25-28 enables a foldable bicycle to be folded without any immoderate compulsion, wherein like components have been designated by the same reference numerals as in the above embodiments.

A hollow cylindrical body 69 having a bolt-passing aperture 69b in its axial direction is formed in its ends with reduced outer diameter portions 69a to form shoulders. The hollow cylindrical body 69 is fixed by welding to a rear surface of a seat tube 11 integral with an upper center tube 16 in the proximity of an upper end of the seat tube 11. Seat stays 12 are formed in their upper ends with apertures 12a into which the reduced outer diameter portions 69a of the hollow cylindrical body 69. A bolt 70 extends through the apertures 12a of the seat stays 12 and the bolt-passing aperture 69b of the hollow cylindrical body 69 and an extending screw threaded end of the bolt 70 is threadedly engaged with a nut 71 so that the upper ends of the seat stays 12 are pivotally secured to the seat pillar 13. In this case, an extending length $l_1$ of the reduced outer diameter portions 69a is preferably slightly longer than a thickness $l_2$ of the upper ends of the seat stays 12 as shown in FIG. 27.

Moreover, each of the seat stay 12 is formed in its lower end with an aperture 12b. A chain stay 10 is provided at its rear end with a rear claw member 72 integrally fixed thereto. The rear claw member 72 is formed in its upper end with an aperture 72a corresponding to the aperture 12b of the seat stay 12. A collar 73 is inserted into the apertures 72a of the rear claw members 72 and apertures 12b of the seat stays 12. A bolt 74 is inserted into the collar 73 and its extending screw threaded end is threadedly engaged with a nut 75 so that the lower ends of the seat stays 12 are pivotally secured to the rear claw members 72 integral with the chain stays 10. In this case, a length $l_3$ of the collar 73 is preferably slightly longer than a sum of a thickness $l_4$ of the upper end of the rear claw member 72 and a thickness $l_5$ of the lower end of the seat stay 12, that is, $l_3 > l_4 + l_5$ as shown in FIG. 28. In this manner, when the bolt 74 and nut 75 are tightened, the pivotal movement of the seat stays 12 and the rear claw members 72 is not obstructed.

As can be seen from the above description, according to this embodiment, the seat stays 12 are not completely fixed to the other frame members so that a foldable bicycle frame can be folded and extended without any compulsion.

According to this embodiment, moreover, the seat stays are detachable and thus superior in exchangeability, easy to repair and capable of being coated with a different paint from that of other frames. Furthermore, as the seat stays can be simply removed from the rear claw members, a driving belt or chain can be extended in an endless or hoop condition about sprockets.

Figure 30:
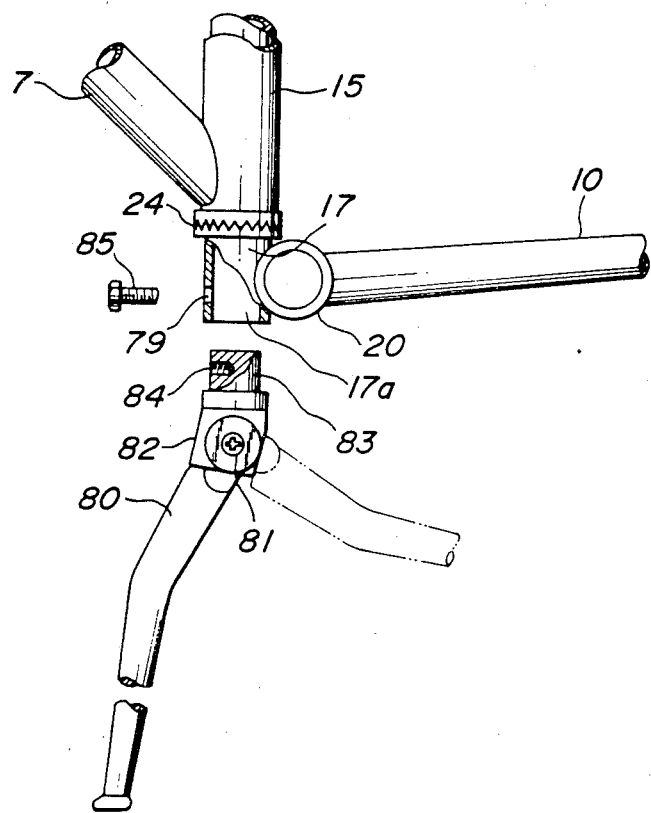
FIG. 30 is an exploded view of main parts associated with the support bar shown in FIG. 29.

FIGS. 29 and 30 illustrate a further embodiment of a bicycle having a support bar or stay rod for preventing it from falling down when not used. As shown in FIG. 30, a lower center tube 17 opens at its lower end at 17a and is formed in its sidewall with a bolt-passing aperture 79. A bracket 82 for pivotally supporting a support rod 80 by means of a shaft is provided on its upper end with a shaft portion 83 adapted to be fitted in the opening 17a of the lower center tube 17 and formed in its side of the shaft portion 83 with a screw-threaded aperture 84. After the shaft portion 83 is inserted upward into the lower center tube 17, a bolt 85 is screwed through the aperture 79 into the screw-threaded aperture 84 to secure the support bar to the bicycle frame.

FIG. 29 illustrates a bicycle having the support bar 80 in the above manner, which is shown in solid lines in an upright position when the bicycle is standing still and in phantom lines in a horizontal position when the bicycle is running.

According to this embodiment, the support bar 80 can be securely fixed to the bicycle frame only by inserting the shaft portion 83 into the opening 17a of the lower center tube 17 and screwing the bolt 85 through the aperture 79 into the screw-threaded aperture 84. Moreover, a removal of the support bar 80 from the bicycle frame can be easily effected by removing the bolt 85 and the shaft portion 83. Accordingly, the support bar 80 can be very easily attached to and removed from the bicycle frame.

After the removal of the support bars, moreover, bicycles according to this embodiment can be simply and neatly exhibited by fitting the openings 17a of lower center tubes 17 onto ends 86a and 86b of branch tubes of a stand 86 for exhibition after removal of support rods 80 as shown in FIG. 31.

This embodiment has the following advantages.

(1) The mounting portion of the support bar comprises a tube and a shaft to form a fitting portion, so that the support bar can be very easily attached to and removed from the bicycle frame, with resulting high exchangeability.

(2) The support bar can be attached to the bicycle frame only by inserting the shaft portion of the pivotal bracket for the support bar into the opening of the lower center tube without any extra parts, so that a harmony of the bicycle as a whole is improved without spoiling beauty of the bicycle.

(3) The opening of the lower center tube for mounting the support bar according to this embodiment also serves as mounting means for a stand for exhibition.

It is further understood by those skilled in the art that the foregoing description is that of preferred embodiments of the disclosed foldable bicycle frame and that various changes and modifications may be made in the invention without departing from the spirit and scope thereof.

What is claimed is:

1. A foldable bicycle frame comprising a substantially vertical center tube at a mid portion of a bicycle frame, an upper center tube and a lower center tube partially fitted in upper and lower ends of said center tube, respectively, a seat supporting tube connected to said upper center tube, a front half of the bicycle frame including said center tube and a rear half of the bicycle frame including said upper and lower center tubes, radially annularly arranged continuous V-shaped teeth on connection surfaces of said upper and lower center tubes and said center tubes, and clamping means for clamping said center tube and said upper and lower center tubes in engagement with said teeth on said connection surfaces, thereby enabling said bicycle frame to be foldable by releasing and then clamping said center tubes.

2. A foldable bicycle frame as set forth in claim 1, wherein said clamping means comprises a bolt passing through said center tube, and said upper and lower center tubes fitted with each other and a nut threadedly engaging said bolt to clamp these center tubes.

3. A foldable bicycle frame as set forth in claim 2, wherein a bolt seat having a bolt passing-aperture is fixed to an inside of a cyclindrical portion of said lower center tube fitted in said center tube and engages a head of said bolt passing through said bolt passing-aperture and said center tubes.

4. A foldable bicycle frame as set forth in claim 1, wherein said frame further comprises positioning means for positioning said front and rear halves in extended and folded conditions, said positioning means comprises fitted portions of said upper and lower center tubes in said center tube, said fitted portions being fitted with each other, said center tube and said fitted portions being formed with elongated slots respectively aligned with each other in extended and folded positions of said bicycle frame, a lever pivotally mounted to said center tube such that a free end of said lever is in opposition to the elongated slot of said center tube, a positioning pin secured to said free end of the lever so as to pass through said elongated slots aligned in said extended and folded positions, and urging means for normally urging said lever toward said center tube.

5. A foldable bicycle frame as set forth in claim 4, wherein said urging means is a coil spring coiled about a pin for pivotally mounting said lever to the center tube, both ends of said coil spring extending so as to urge the center tube and the lever relative to each other.

6. A foldable bicycle frame as set forth in claim 1, wherein said clamping means comprises an intermediate disc integral with said lower center tube and formed with a bolt-passing aperture substantially at its center, a lower disc integral with said upper center tube and formed with a bolt-passing aperture substantially at its center, a spring located in compression between said intermediate and lower discs, a bolt extending through said intermediate and lower discs beyond said upper center tube, a lever pivotally secured to an upper end of said bolt extending above said upper center tube, at least one cam interlocked with said lever and engaging said upper center tube so that pivotal movement of said lever causes the engagement of said teeth to be clamped and released.

7. A foldable bicycle frame as set forth in claim 6, wherein said bolt is divided into an upper bolt and a lower bolt which are connected by a connecting nut, thereby adjusting an overall length of said bolt by rotating the connecting nut, and at least one dish-shaped spring is arranged between a lower head of said bolt and said intermediate disc of said lower center tube, thereby adjusting the force urging the upper and lower tubes against the center tube by the adjustment of the overall length of said bolt.

8. A foldable bicycle frame as set forth in claim 7, wherein at least one of said bolt-passing apertures of said intermediate and lower discs is formed in an irregular shape other than a circle, and a shank of said bolt passing through said irregularly shaped bolt-passing aperture is formed in an irregular cross-section so as to be fitted in said irregularly shaped bolt-passing aperture to prevent the bolt from being rotated when adjusting the overall length of the bolt.

9. A foldable bicycle frame as set forth in claim 6, wherein said cam is an eccentric cam and its center is located on a side with respect to an eccentric center when the lever is in a fixed position such that said lever is not returned by an action of said spring.

10. A foldable bicycle frame as set forth in claim 6, wherein said cam is an eccentric cam and a ring is slidably fitted on an outer circumference of said eccentric cam such that an outer circumference of said ring is substantially in rolling contact with an upper portion of said upper center tube and an inner circumference of said ring slides on the outer circumference of said cam.

11. A foldable bicycle frame as set forth in claim 6, wherein said lever comprises locking means which comprises an anchoring member in the form of a hook provided on said bicycle frame at a location where a free end of said lever is adjacent thereto when clamped, a lock member pivotally mounted on said lever and having a projection extending through an opening formed in an upper surface near to said free end and an opening formed in an intermediate portion of said lock member and engaging said anchoring member, and urging means for urging said lock member against said anchoring member and into engagement therewith.

12. A foldable bicycle frame as set forth in claim 11, wherein said anchoring member has a round head and said lock member has a curved lower end such that while the lever is being moved into the clamping position, said curved lower end of the lock member engages said round head of the anchoring member so as to permit said lock member to be rocked in a direction for receiving a hook portion of said anchoring member into said opening of the lock member.

13. A foldable bicycle frame as set forth in claim 11, wherein said urging means is a coil spring about a pin for pivotally mounting said lock member on said lever and having one end engaging said lever and the other end engaging said lock member.

14. A foldable bicycle frame as set forth in claim 1, wherein upper ends of seat stays are pivotally connected to a seat tube integral with said upper center tube and lower ends of said seat stays are pivotally connected to rear ends of chain stays.

15. A foldable bicycle frame as set forth in claim 14, wherein said pivotal connection at said upper ends of said seat stays comprises a hollow cylinder being secured to said seat tube by welding and having a bolt-passing aperture in its axial direction and reduced outer diameter portions at its ends, on which are pivotally fitted apertures formed in said upper ends of said seat stays, and fastening means passing through said apertures of said upper ends of said seat stays and said bolt-passing aperture of the hollow cylinder.

16. A foldable bicycle frame as set forth in claim 14, wherein said pivotal connection at said lower ends of said seat stays comprises fastening means passing through apertures formed in said lower ends of said seat stays and apertures formed in rear claw members integral with chain stays.

17. A foldable bicycle frame as set forth in claim 1, wherein said frame further comprises a support bar supporting said bicycle frame against falling down, a bracket for pivotably supporting said support bar selectively into operative and inoperative positions, said bracket being provided on its upper portion with a shaft portion capable of detachably fitting in a lower opening of said lower center tube, and fastening means for fixing said bracket to the lower center tube.

* * * * *